US011314320B2

(12) United States Patent
Lu et al.

(10) Patent No.: US 11,314,320 B2
(45) Date of Patent: Apr. 26, 2022

(54) INTERFACE BETWEEN HOST PROCESSOR AND WIRELESS PROCESSOR FOR ARTIFICIAL REALITY

(71) Applicant: Facebook Technologies, LLC, Menlo Park, CA (US)

(72) Inventors: Gang Lu, Pleasanton, CA (US); Jiwon Steve Han, San Ramon, CA (US); Nihar Doshi, Menlo Park, CA (US); Xiaoguang Wang, Sunnyvale, CA (US); Qi Qu, Redmond, WA (US); Dong Zheng, Saratoga, CA (US); Chunyu Hu, Saratoga, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/860,898

(22) Filed: Apr. 28, 2020

(65) Prior Publication Data
US 2021/0333866 A1 Oct. 28, 2021

(51) Int. Cl.
*G06F 3/01* (2006.01)
*H04W 84/18* (2009.01)
(52) U.S. Cl.
CPC ............. *G06F 3/012* (2013.01); *H04W 84/18* (2013.01)
(58) Field of Classification Search
CPC ...... G02B 27/017; G02B 27/01; G06T 19/00; H04W 52/0219
See application file for complete search history.

(56) References Cited

U.S. PATENT DOCUMENTS

| 10,142,276 | B2* | 11/2018 | Rapaport | ............... H04L 51/32 |
| 10,242,501 | B1* | 3/2019 | Pusch | ................... H04N 19/43 |
| 11,039,393 | B1* | 6/2021 | Rangineni | ............ H04W 76/30 |
| 2005/0036469 | A1* | 2/2005 | Wentink | ........... H04W 52/0216 |
| | | | | 370/338 |
| 2006/0146834 | A1* | 7/2006 | Baker | ............... H04W 36/0088 |
| | | | | 370/395.53 |
| 2007/0037548 | A1* | 2/2007 | Sammour | ......... H04W 52/0235 |
| | | | | 455/343.2 |
| 2007/0238437 | A1* | 10/2007 | Jaakkola | ........... H04W 52/0251 |
| | | | | 455/343.1 |

(Continued)

OTHER PUBLICATIONS

International Search report and Written Opinion for International Application No. PCT/US2021/024227, dated Jul. 16, 2021, 9 pages.

*Primary Examiner* — William Lu
(74) *Attorney, Agent, or Firm* — Foley & Lardner LLP

(57) ABSTRACT

Disclosed herein are devices and methods related to an interface between a host processor and a wireless processor of a first device for maintaining an artificial reality session with a second device. In one aspect, the host processor is configured to provide data of the artificial reality session to the wireless processor, and the wireless processor is configured to transmit the data to the second device through a wireless medium. In one aspect, the host processor is configured to provide an indicator indicating an end of transmission of the data, to the wireless processor, to cause the wireless processor to transmit the indicator to the second device through the wireless medium, and to cause the host processor and the wireless processor to enter a sleep state in response to transmission of the indicator. The indicator may cause the second device to enter the sleep state.

20 Claims, 6 Drawing Sheets

(56) References Cited

U.S. PATENT DOCUMENTS

| | | | |
|---|---|---|---|
| 2009/0279464 A1* | 11/2009 | Kakani | H04W 52/0219 |
| | | | 370/311 |
| 2010/0315983 A1* | 12/2010 | Choi | H04W 52/0251 |
| | | | 370/311 |
| 2014/0153460 A1* | 6/2014 | Shrivastava | H04W 56/00 |
| | | | 370/311 |
| 2015/0062022 A1 | 3/2015 | Rabii | |
| 2015/0092642 A1* | 4/2015 | Geboff | H04W 56/00 |
| | | | 370/311 |
| 2016/0103480 A1* | 4/2016 | Sanghi | G06F 9/4405 |
| | | | 710/313 |
| 2016/0218885 A1* | 7/2016 | Manea | H04L 12/40032 |
| 2019/0110264 A1 | 4/2019 | Chung et al. | |
| 2020/0139231 A1* | 5/2020 | Colenbrander | H04N 21/63 |
| 2020/0261799 A1* | 8/2020 | Cahill | A63F 13/92 |
| 2020/0360823 A1* | 11/2020 | Cahill | A63F 13/847 |

\* cited by examiner

INTERFACE BETWEEN HOST PROCESSOR AND WIRELESS PROCESSOR FOR ARTIFICIAL REALITY

FIELD OF DISCLOSURE

The present disclosure is generally related to communication for rendering artificial reality, including but not limited to interface between a host processor and a wireless processor for presenting an artificial reality.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space).

In one implementation, an image of a virtual object is generated by a console communicatively coupled to the HWD. In one example, the HWD includes various sensors that detect a location and/or orientation of the HWD, and transmits the detected location and/or orientation of the HWD to the console through a wired connection or a wireless connection. The console can determine a user's view of the space of the artificial reality according to the detected location and/or orientation of the HWD, and generate image data indicating an image of the space of the artificial reality corresponding to the user's view. The console can transmit the image data to the HWD, by which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., 11 ms or 16 ms). Any latency between a movement of the user wearing the HWD and an image displayed corresponding to the user movement can cause judder, which may result in motion sickness and can degrade the user experience.

SUMMARY

Various embodiments disclosed herein are related to a first device for artificial reality. In some embodiments, the first device includes a wireless processor, and a host processor coupled to the wireless processor. In some embodiments, the host processor is configured to provide data of an artificial reality session to the wireless processor. In some embodiments, the wireless processor is configured to transmit the data to a second device through a wireless medium. In some embodiments, the first device and the second device include a head wearable device and a console for maintaining the artificial reality session. In some embodiments, the host processor is configured to provide an indicator indicating an end of transmission of the data, to the wireless processor. The indicator may cause the wireless processor to transmit the indicator to the second device through the wireless medium, and may cause the host processor and the wireless processor to enter a sleep state in response to transmission of the indicator.

In some embodiments, the host processor is configured to provide the data to the wireless processor through a network layer protocol of communication between the host processor and the wireless processor. In some embodiments, the indicator causes the second device to enter the sleep state. In some embodiments, the host processor and the wireless processor are scheduled to enter an active state at a first time for the artificial reality session. In some embodiments, the host processor is configured to provide another indicator to the wireless process to cause the wireless processor enter the active state at a second time for a subsequent artificial reality session, a difference between the first time and the second time corresponding to a frame time.

In some embodiments, the second device includes another host processor and another wireless processor coupled to the another host processor. In some embodiments, the another wireless processor is configured to provide the data from the wireless processor to the another host processor. In some embodiments, the another host processor is configured to render the artificial reality session according to the data. In some embodiments, the another wireless processor is configured to provide the indicator from the wireless processor to the another host processor. In some embodiments, the another wireless processor and the another host processor are configured to enter the sleep state in response to the indicator.

In some embodiments, the host processor is configured to provide, to the wireless processor, a command for synchronization. In some embodiments, the wireless processor is configured to provide a synchronization between a clock of the wireless processor and a clock of the host processor, in response to the command. In some embodiments, the wireless processor is configured to transmit, to the second device through the wireless medium, the command. In some embodiments, another wireless processor and another host processor of the second device are configured to synchronize with the host processor according to the command. In some embodiments, the host processor is configured to schedule a time to enter an active state for the wireless processor, the host processor, the another wireless processor, and the another host processor.

Various embodiments disclosed herein are related to a method for rendering artificial reality. In some embodiments, the method includes providing, by a host processor of a first device, data of an artificial reality session to a wireless processor coupled to the host processor. In some embodiments, the method includes transmitting, by the wireless processor, the data to a second device through a wireless medium. In some embodiments, the first device and the second device include a head wearable device and a console for maintaining the artificial reality session. In some embodiments, the method includes providing, by the host processor, an indicator indicating an end of transmission of the data, to the wireless processor. The indictor may cause the wireless processor to transmit the indicator to the second device through the wireless medium, and may cause the host processor and the wireless processor to enter a sleep state in response to transmission of the indicator.

In some embodiments, providing the data to the wireless processor of the first device includes providing the data to the wireless processor through a network layer of communication between the host processor and the wireless processor. In some embodiments, the method includes entering, by the host processor and the wireless processor, an active state at a first time for the artificial reality session. In some embodiments, the method further includes providing, by the host processor, another indicator to the wireless processor to cause the wireless processor to enter the active state at a second time for a subsequent artificial reality session, a difference between the first time and the second time corresponding to a frame time.

In some embodiments, the wireless processor is configured to transmit the data and the indicator to the second device, the indicator causing the second device to enter the sleep state after rendering the artificial reality session according to the data. In some embodiments, the method further includes synchronizing, by the first device, the second device with the first device. The first device and the second device may enter an active state for additional data of the artificial reality session according to the synchronization.

Various embodiments disclosed herein are related to a first device for artificial reality. In some embodiments, the first device includes a wireless processor configured to receive, from a second device through a wireless medium, data of an artificial reality session, and receive, from the second device through the wireless medium, an indicator indicating an end of transmission of the data. In some embodiments, the first device includes a host processor coupled to the wireless processor. In some embodiments, the host processor is configured to present the artificial reality session according to the data, and enter a sleep state, in response to the indicator after presenting the artificial reality session.

In some embodiments, the host processor and the wireless processor are scheduled to enter an active state for a subsequent artificial reality session. In some embodiments, the wireless processor is configured to provide the data and the indicator to the host processor through a network layer protocol of communication between the host processor and the wireless processor. In some embodiments, the wireless processor is configured to receive, from the second device through the wireless medium, a command for synchronization. In some embodiments, the host processor is configured to synchronize a first clock of the host processor with a second clock of the wireless processor, in response to the command.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
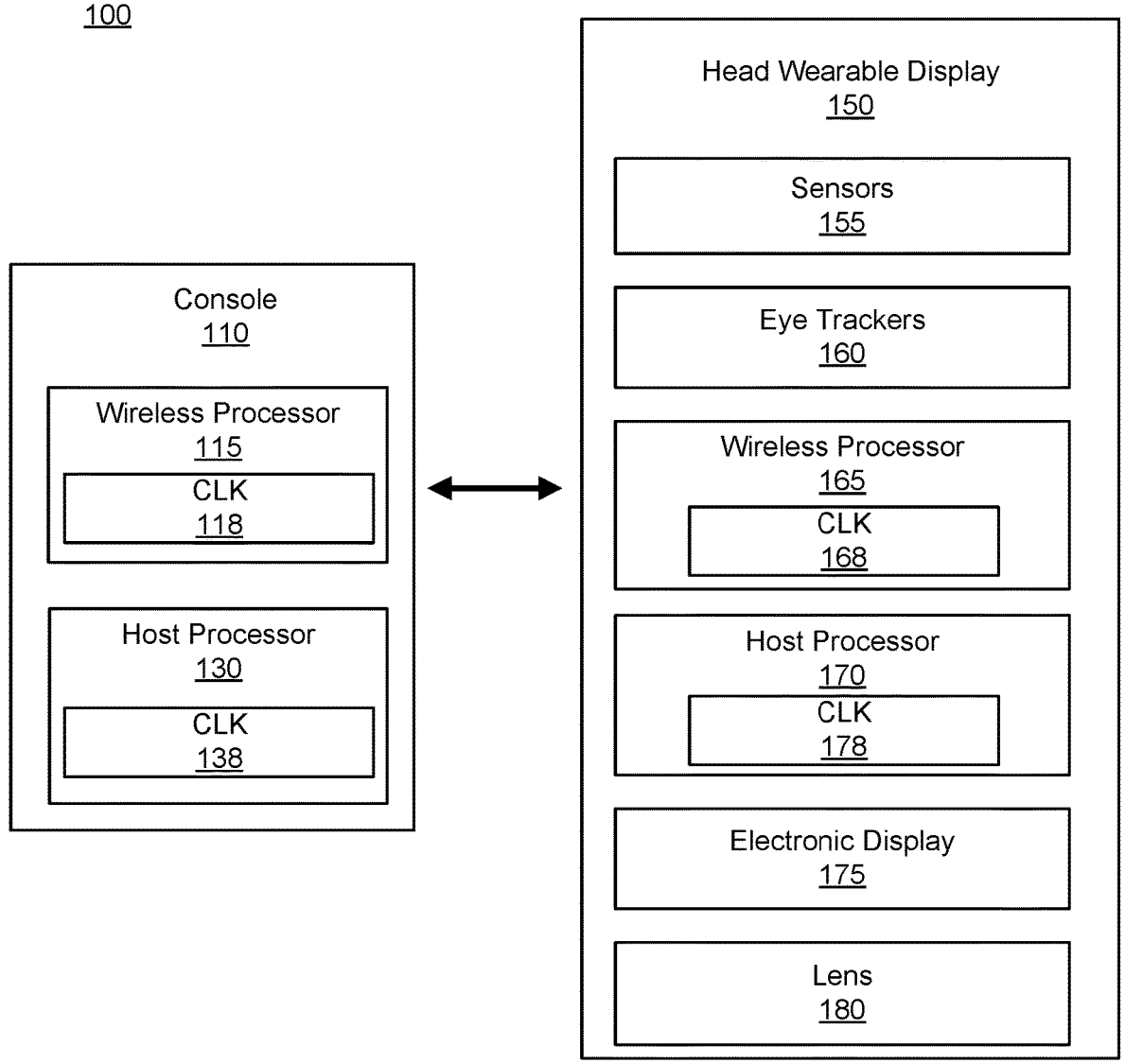
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are related to an interface between a first host processor and a first wireless processor of a first device (e.g., a HWD or console) for maintaining an artificial reality session with a second device (e.g., a console or HWD) including a second host processor and a second wireless processor. The first host processor and the second host processor may be central processing units, graphics processing units, image processors, or any processors for computing or processing data such as generating images of the artificial reality. The first wireless processor and the second wireless processor may include or correspond to communication interfaces, communication modems, transceivers, or any processors for transmitting and receiving data through a wireless medium, which may include processing received data for local use or processing data for transmitting. In one aspect, the first host processor (e.g., of a console as the first device) generates data of the artificial reality session, and causes the first wireless processor to transmit the data to the second device through a wireless medium. The second wireless processor (e.g., of a HWD as the second device) may receive the data through the wireless medium, and the second host processor may render an artificial reality according to the data received by the wireless processor.

In some embodiments, the first host processor configures or causes the first device and the second device to enter a sleep state. In one approach, the first host processor generates an indicator for configuring the first device and the second device to enter the sleep state (e.g., inactive, low power or power saving state). In one aspect, the indicator may indicate, include, or correspond to an end of transmission of the data. The first host processor may provide, send or signal the indicator to the first wireless processor. In response to completing transmission of the data, the first wireless processor may signal, send or otherwise transmit the indicator to the second device through the wireless medium. In response to transmission of the indicator, the first wireless processor and the first host processor may enter the sleep state. The second wireless processor may receive the indicator through the wireless medium, and may provide the indicator to the second host processor. In response to the indicator, the second host processor may configure the second host processor and the second wireless processor to enter the sleep state.

In some embodiments, the first host processor is scheduled to wake up at a scheduled time, and enter or initiate an active state (e.g., wake up or power up state). The scheduled time may be a frame time for continuing the (current) artificial reality session or enabling a subsequent artificial reality session. In response to waking up from the sleep state, the first host processor may cause or configure the first wireless processor to wake up. Similarly, the second host processor may be scheduled to wake up at the scheduled time. In response to waking up from the sleep state, the second host processor may cause or configure the second wireless processor to wake up and/or initiate/enter the active state. Accordingly, communication between the first device and the second device can be established to continue the artificial reality session or enable the subsequent artificial reality session.

In one aspect, the first device and the second device may communicate with each other for rendering an artificial reality in a power efficient manner. In one aspect, the first device and the second device operating in the active state may consume more power as compared to operating in the sleep state. Hence, by operating the first device and the second device in the sleep up state when communication between the first device and the second device is not needed, power consumption of the first device and the second device can be reduced.

Advantageously, the first host processor, the second host processor or both can generate one or more instructions or commands to configure or cause the first device and the second device (e.g., the console and HWD) to transition between the active state and the sleep state in a synchronized manner to improve power efficiency. In one implementation, the first host processor, the first wireless processor, the second wireless processor, and the second host processor may operate according to different (e.g., local) clocks. Any mismatch in the clocks may cause unsuccessful communication or loss of packets. For example, the second wireless processor operating in the sleep state may not receive data transmitted by the first wireless processor. To ensure successful communication despite the mismatches in the clocks, a time period for the active state can be increased while a time period for the sleep state can be reduced. However, as the time period for the active state is increased and the time period for the sleep state is reduced, power consumption of the first device and the second device may increase. In one aspect, the first host processor and the second host processor may maintain better synchronization than the first wireless processor and the second wireless processor. In some embodiments, the first host processor and/or the second host processor can generate instructions or commands to maintain synchronization and configure operating states of the first host processor, the first wireless processor, the second wireless processor, and the second host processor according to the synchronization. Hence, mismatches in clocks of the first host processor, the first wireless processor, the second wireless processor, and the second host processor can be reduced or avoided, such that the time period for the sleep state can be increased and/or synchronized to improve power efficiency.

FIG. 1 is a block diagram of an example artificial reality system environment 100. In some embodiments, the artificial reality system environment 100 includes a HWD 150 worn by a user, and a console 110 providing content of artificial reality to the HWD 150. The HWD 150 may be referred to as, include, or be part of a head mounted display (HMD), head mounted device (HMD), head wearable device (HWD), head worn display (HWD) or head worn device (HWD). The HWD 150 may detect its location and/or orientation of the HWD 150 as well as a shape, location, and/or an orientation of the body/hand/face of the user, and provide the detected location/or orientation of the HWD 150 and/or tracking information indicating the shape, location, and/or orientation of the body/hand/face to the console 110. The console 110 may generate image data indicating an image of the artificial reality according to the detected location and/or orientation of the HWD 150, the detected shape, location and/or orientation of the body/hand/face of the user, and/or a user input for the artificial reality, and transmit the image data to the HWD 150 for presentation. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a wireless processor 165, a host processor 170, an electronic display 175, and a lens 180. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detect a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the HWD 150, the console 110 or a combination of them may incorporate the gaze direction of the user of the HWD 150 to generate image data for artificial reality. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gate direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the wireless processor 165 includes an electronic component or a combination of an electronic component and a software component that communicates with the console 110. In some embodiments, the wireless processor 165 includes or is embodied as a transceiver or a communication modem coupled to the transceiver for transmitting and receiving data through a wireless medium. The wireless processor 165 may communicate with a wireless processor 115 of the console 110 through a communication link. The communication link may be a wireless link. Examples of the wireless link can include a cellular communication link, a near field communication link, IEEE 801.11 based link (e.g., Wi-Fi), Bluetooth, 60 GHz wireless link, or any communication wireless communication link. Through the communication link, the wireless processor 165 may transmit to the console 110 data indicating the determined location and/or orientation of the HWD 150, the determined gaze direction of the user, and/or hand tracking measurement. Moreover, through the communication link, the wireless processor 165 may receive from the console 110 image data indicating or corresponding to an image to be rendered. In some embodiments, the wireless processor 165 includes or is coupled to a clock 168, and operates synchronously according to the clock 168.

In some embodiments, the host processor 170 includes an electronic component or a combination of an electronic component and a software component that generates one or more images for display, for example, according to a change in view of the space of the artificial reality. In some embodiments, the host processor 170 is implemented as a processor (or a graphical processing unit (GPU)) that executes instructions to perform various functions described herein. The host processor 170 may receive, through the wireless processor 165, image data describing an image of artificial reality to be rendered, and render the image through the electronic display 175. In some embodiments, the image data from the console 110 may be encoded, and the host processor 170 may decode the image data to render the image. In some embodiments, the host processor 170 receives, from the console 110, object information indicating virtual objects in the artificial reality space and depth information indicating depth (or distances from the HWD 150) of the virtual objects. In one aspect, according to the image of the artificial reality, object information, depth information from the console 110, and/or updated sensor measurements from the sensors 155, the host processor 170 may perform shading, reprojection, and/or blending to update the image of the artificial reality to correspond to the updated location and/or orientation of the HWD 150. In some embodiments, the host processor 170 includes or is coupled to a clock 178, and operates synchronously according to the clock 178.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the host processor 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the host processor 170 performs compensation to compensate for any distortions or aberrations. In one aspect, the lens 180 introduces optical aberrations such as a chromatic aberration, a pin-cushion distortion, barrel distortion, etc. The host processor 170 may determine a compensation (e.g., predistortion) to apply to the image to be rendered to compensate for the distortions caused by the lens 180, and apply the determined compensation to the image from the host processor 170. The host processor 170 may provide the predistorted image to the electronic display 175.

In some embodiments, the console 110 is an electronic component or a combination of an electronic component and a software component that provides content to be rendered to the HWD 150. In one aspect, the console 110 includes a wireless processor 115 and a host processor 130. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. The console 110 may provide the image data to the HWD 150 for presentation of the artificial reality. In other embodiments, the console 110 includes more, fewer, or different components than shown in FIG. 1.

In some embodiments, the wireless processor 115 is an electronic component or a combination of an electronic component and a software component that communicates with the HWD 150. In some embodiments, the wireless processor 115 includes or is embodied as a transceiver or a communication modem coupled to the transceiver for transmitting and receiving data through a wireless medium. The wireless processor 115 may be a counterpart component to the wireless processor 165 to communicate with the wireless processor 115 of the console 110 through a communication link (e.g., wireless link). Through the communication link, the wireless processor 115 may receive from the HWD 150 data indicating the determined location and/or orientation of the HWD 150, the determined gaze direction of the user, and/or the hand tracking measurement. Moreover, through the communication link, the wireless processor 115 may transmit to the HWD 150 image data describing an image to be rendered. In some embodiments, the wireless processor 115 includes or is coupled to a clock 118, and operates synchronously according to the clock 118.

The host processor 130 can include or correspond to a component that generates content to be rendered according to the location and/or orientation of the HWD 150. In some embodiments, the host processor 130 includes or is embodied as one or more central processing units, graphics processing units, image processors, or any processors for generating images of the artificial reality. In some embodiments, the host processor 130 may incorporate the gaze direction of the user of the HWD 150 and a user interaction in the artificial reality to generate the content to be rendered. In one aspect, the host processor 130 determines a view of the artificial reality according to the location and/or orientation of the HWD 150. For example, the host processor 130 maps the location of the HWD 150 in a physical space to a location within an artificial reality space, and determines a view of the artificial reality space along a direction corresponding to the mapped orientation from the mapped location in the artificial reality space. The host processor 130 may generate image data describing an image of the determined view of the artificial reality space, and transmit the image data to the HWD 150 through the wireless processor 115. The host processor 130 may encode the image data describing the image, and can transmit the encoded data to the HWD 150. In some embodiments, the host processor 130 generates and provides the image data to the HWD 150 periodically (e.g., every 11 ms or 16 ms). In some embodiments, the host processor 130 includes or is coupled to a clock 138, and operates synchronously according to the clock 138.

Figure 2:
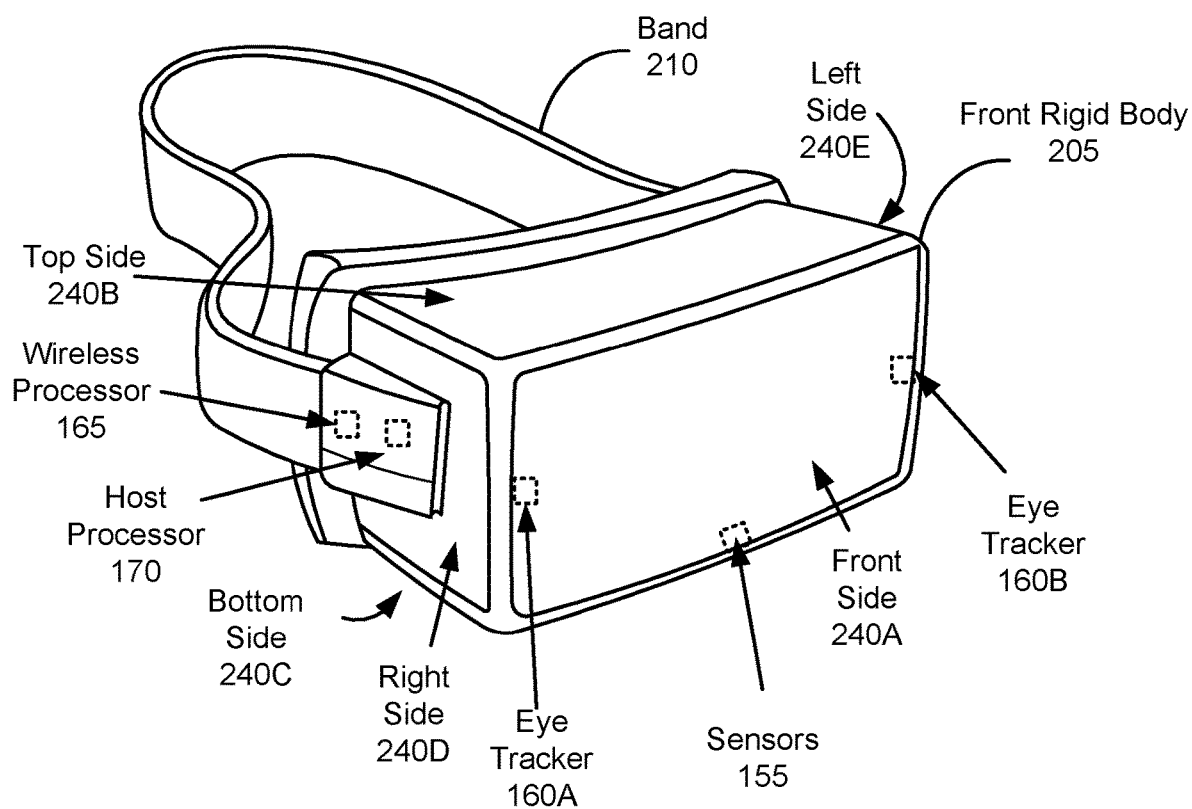
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, the wireless processor 165, and the host processor 170. In the embodiment shown by FIG. 2, the wireless processor 165, the host processor 170, and the sensors 155 are located within the front rigid body 205, and may not visible to the user. In other embodiments, the HWD 150 has a different configuration than shown in FIG. 2. For example, the wireless processor 165, the host processor 170, the eye trackers 160A, 160B, and/or the sensors 155 may be in different locations than shown in FIG. 2.

Figure 3:
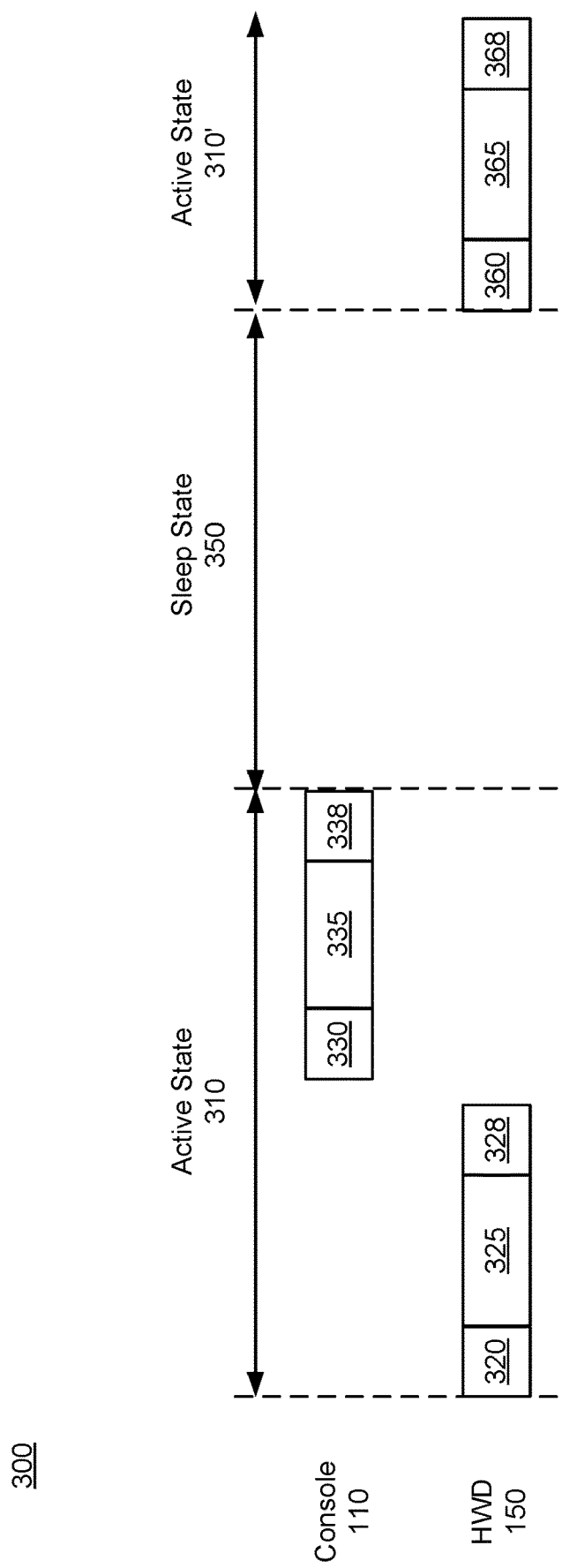
FIG. 3 is a timing diagram of remotely presenting an artificial reality, according to an example implementation of the present disclosure.

FIG. 3 is a timing diagram 300 of remotely presenting an artificial reality (e.g., using a HWD), according to an example implementation of the present disclosure. In some embodiments, the console 110 and the HWD 150 transition between an active state 310 and a sleep state 350 in a synchronous manner to achieve power efficiency. In the active state 310, the console 110 and the HWD 150 may maintain a communication session to exchange data for rendering artificial reality. In the sleep state 350, the console 110 and the HWD 150 may stop or disable a communication session. In one aspect, the console 110 and the HWD 150 operating in the active state 310 consume more power than the console 110 and the HWD 150 operating in the sleep state 350. By operating the console 110 and the HWD 150 in the sleep up state 350 when communication between the console 110 and the HWD 150 is not needed, power consumption of the console 110 and the HWD 150 can be reduced.

In the active state 310, the HWD 150 may perform listen before transmit (LBT) 320 to determine whether the HWD 150 is able to transmit. In response to determining that the HWD 150 is clear to send, the HWD 150 may transmit sensor measurements 325 indicating a location and/or orientation of the HWD 150 to the console 110. In response to transmission of the sensor measurements 325, the HWD 150 may transmit an end of transmission 328 of the sensor measurements. The console 110 may receive the sensor measurements, and generate image data of a view of an artificial reality according to the sensor measurements. For example, the console 110 may map the location of the HWD 150 in a physical space to a location within the artificial reality space, and determine a view of the artificial reality space along a direction corresponding to the mapped orientation from the mapped location in the artificial reality space. Then, the console 110 may generate the image data describing or indicating the determined view of the artificial reality space.

In the active state 310, the console 110 may perform LBT 330 to determine whether the console 110 is able to transmit. In response to determining that the console 110 is clear to send, the console 110 may transmit the image data 335 of the view of the artificial reality to the HWD 150. In response to transmission of the image data, the console 110 may transmit an end of transmission 338 of the image data. The HWD 150 may receive the image data, and may render the image of the artificial reality according to the image data.

In one aspect, in response to completing the image data, the console 110 and the HWD 150 may enter the sleep state 350. The console 110 and the HWD 150 operating in the sleep state 350 may consume less power than in the active state 310. The console 110 and the HWD 150 may be scheduled to wake up at a scheduled time. The scheduled time may be a frame time for continuing the artificial reality session or for enabling a subsequent artificial reality session. For example, the console 110 and the HWD 150 may be scheduled to wake up every 11 ms or 16 ms for rendering a frame of the artificial reality.

In a subsequent active state 310', the HWD 150 may repeat the process for the subsequent frame. For example, the HWD 150 may perform LBT 360 to determine whether the HWD 150 is able or clear to transmit/send. In response to determining that the HWD 150 is clear to send, the HWD 150 may transmit sensor measurements 365 indicating an updated location and/or orientation of the HWD 150 to the console 110. In response to transmission of the sensor measurements 365, the HWD 150 may transmit an end of transmission 368 of the sensor measurements. In one aspect, the HWD 150 and the console 110 are configured to enter the active state 310 at a first time, and enter the active state 310' at a second time, where a difference between the first time and the second time corresponds to a frame time (e.g., 11 ms or 16 ms).

Figure 4:
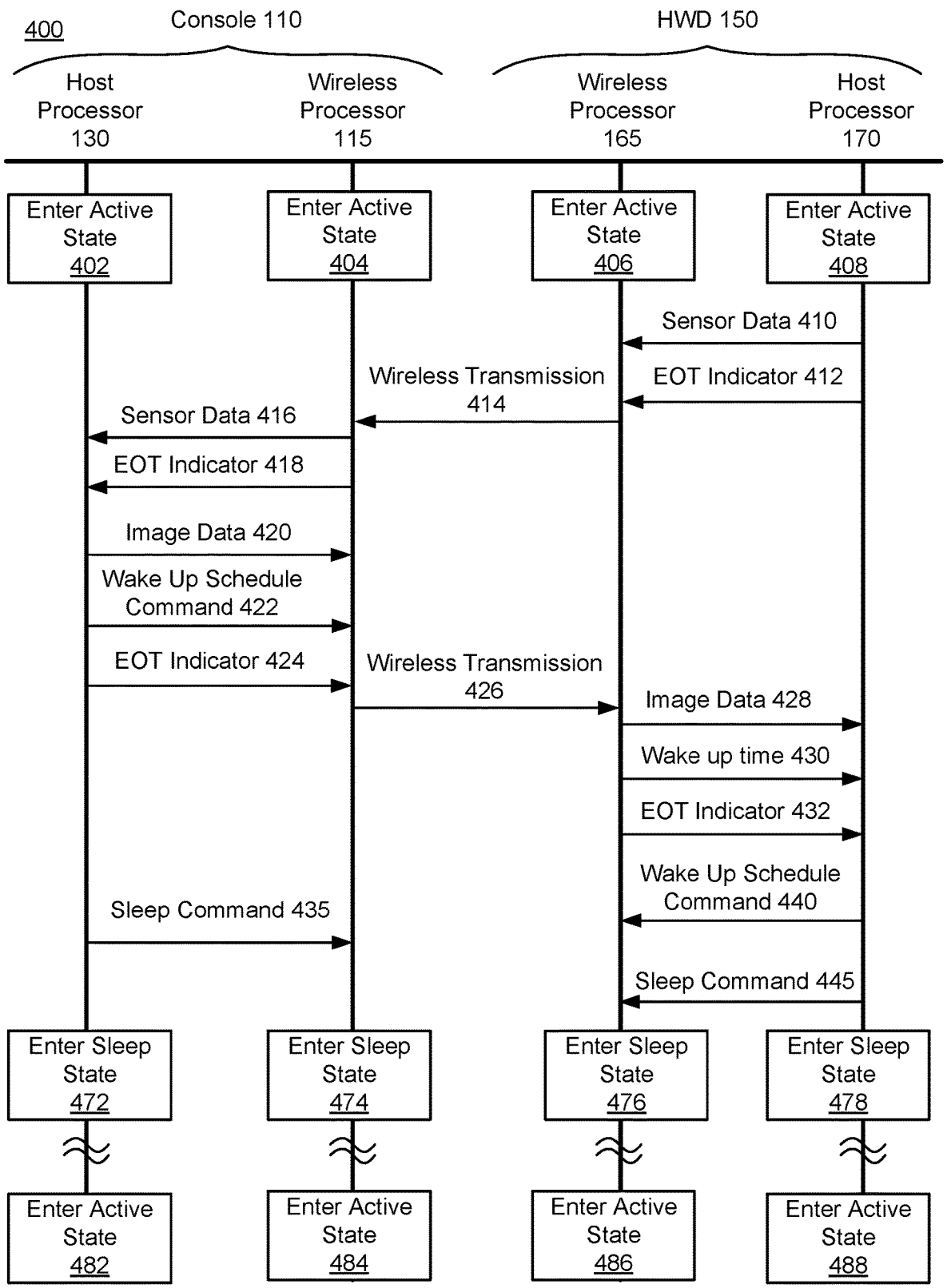
FIG. 4 is an interaction diagram showing a process of a console and a head wearable display exchanging data for artificial reality, according to an example implementation of the present disclosure.

FIG. 4 is an interaction diagram showing a process 400 of the console 110 and the HWD 150 exchanging data for artificial reality, according to an example implementation of the present disclosure. In some embodiments, the process 400 is performed by the host processor 130 and the wireless processor 115 of the console 110 and the host processor 170 and the wireless processor 165 of the HWD 150. In some embodiments, the process 400 is performed by other entities or other components. In some embodiments, the process 400 includes more, fewer, or different steps than shown in FIG. 4.

In some embodiments, the host processor 130, the wireless processor 115, the wireless processor 165, and the host processor 170 enter 402, 404, 406, 408 an active state from a sleep state at a scheduled time or a wake up time. The scheduled time may be a frame time for exchanging data associated with artificial reality. In the active state, the host processor 130, the wireless processor 115, the wireless processor 165, and the host processor 170 can operate together to initiate and/or maintain a communication session for artificial reality. In the sleep state, the host processor 130, the wireless processor 115, the wireless processor 165, and the host processor 170 can suspend or end the communication session for the artificial reality. In one aspect, the console 110 and the HWD 150 operating in the sleep state consume less power than in the active state.

In some embodiments, the host processor 170 generates 410 sensor data including sensor measurements. The sensor measurements may indicate a location and/or orientation of the HWD 150. The host processor 170 may provide the sensor data to the wireless processor 165 for transmission. In some embodiments, in response to completing the providing of the sensor data or detecting an end of the sensor data, the host processor 170 may generate an end of transmission (EOT) indicator indicating an end of the sensor data, and provide 412 the EOT indicator to the wireless processor 165.

In one approach, the wireless processor 165 upconverts the sensor data and the EOT indicator to obtain a wireless signal, and transmits 414 the wireless signal through the wireless medium. The wireless processor 165 may generate and transmit a single frame for the sensor data and the EOT indicator. Alternatively, the wireless processor 165 may generate and transmit separate frames for the sensor data and the EOT indicator.

In some embodiments, the wireless processor 115 of the console 110 receives one or more frames from the wireless processor 165 of the HWD 150 through the wireless medium. The wireless processor 115 may downconvert the received frame and provide 416, 418 sensor data and EOT indicator data to the host processor 130.

In some embodiments, the host processor 130 generates image data of artificial reality, in response to the sensor data. In one approach, the host processor 130 determines a view of an artificial reality corresponding to the location and/or the orientation of the HWD 150. The host processor 130 may generate the image data describing or indicating the determined view of the artificial reality. The host processor 130 can provide 420 the image data to the wireless processor 115. In some embodiments, the host processor 130 schedules a wake up time for a subsequent artificial reality session, and provides 422, to the wireless processor 115, a wake-up schedule command instructing the wireless processor 115 to wake up at the wake up time. In some embodiments, in response to completing the providing of the image data or detecting an end of the image data, the host processor 130 may generate an end of transmission (EOT) indicator indicating an end of the image data, and provide 424 the EOT indicator to the wireless processor 115. After providing the EOT indicator, the host processor 130 may provide 435 a sleep command to the wireless processor 115, and enter 472 the sleep state. In some embodiments, the host processor 130 provides data, instructions, and/or commands to the wireless processor 115 through a network layer communication protocol (L3 layer protocol).

In some embodiments, the wireless processor 115 receives the image data, the wake-up schedule command, and the EOT indicator, and can transmit 426 the received image data, the wake-up schedule command and the EOT indicator through a wireless medium to the HWD 150. In one approach, the wireless processor 115 upconverts the image data, the wake-up schedule command, and the EOT indicator to obtain a wireless signal, and transmits the wireless signal through the wireless medium. The wireless processor 115 may generate and transmit a single frame for the image data, the wake-up schedule command, and the EOT indicator. Alternatively, the wireless processor 115 may generate and transmit separate frames for the image data, the wake-up schedule command, and the EOT indicator. In response to the wake-up schedule command, the wireless processor 115 may be scheduled to wake up at the wake up time. In response to the sleep command, the wireless processor 115 may enter 474 the sleep state after completing the wireless transmission.

In some embodiments, the wireless processor 165 of the HWD 150 receives one or more frames from the wireless processor 115 of the console 110 through the wireless medium. The wireless processor 165 may downconvert the received frame and provide data, instructions or commands to the host processor 170. The wireless processor 165 may provide data, instructions, or commands to the host processor 170 through a network layer communication protocol (L3 layer protocol).

In one approach, the wireless processor 165 obtains the image data from one or more frames received through the wireless medium, and provides 428 the image data to the host processor 170. According to the image data, the host processor 170 may generate an image of the artificial reality as indicated by the image data. In some embodiments, the host processor 170 may perform additional processes such as shading and a reprojection for generating the image of the artificial reality. The host processor 170 may render or present the image of the artificial reality to a user of the HWD 150.

In one approach, the wireless processor 165 obtains the wake up time from one or more frames received through the wireless medium, and provides 430 the wake up time to the host processor 170. The host processor 170 may be scheduled to wake up at the wake up time. In response to the wake up time, the host processor 170 may generate and provide 440, to the wireless processor 165, a wake-up schedule command instructing the wireless processor 165 to wake up at the wake up time. The host processor 170 may provide the wake-up schedule command to the wireless processor 165 through a network layer communication protocol (L3 layer protocol).

In one approach, the wireless processor 165 obtains the EOT indicator from one or more frames received through the wireless medium, and provides 432 the EOT indicator to the host processor 170. In response to the EOT indicator, the host processor 170 may generate and provide 445, to the wireless processor 165, a sleep command instructing the wireless processor 165 to enter the sleep state. The host processor 170 may provide the sleep command to the wireless processor 165 through a network layer communication protocol (L3 layer protocol). In response to the sleep command, the wireless processor 165 may enter 476 the sleep state. After providing the sleep command, the host processor 170 may enter 478 the sleep state. In some embodiments, the host processors 130, 170 and the wireless processors 115, 165 can wake up at the wake up time to enter 482, 484, 486, 488 the active state for the subsequent communication session for the artificial reality and repeat the process.

In some embodiments, the wake-up scheduling is performed selectively. For example, the wake-up scheduling may be performed for every predetermined number of wake up events (e.g., every $5^{th}$ active state). For another example, the wake-up scheduling may be performed upon receiving a request from a user. In case the wake-up scheduling is performed selectively, the steps 422, 430, 440 can be omitted when the wake-up scheduling is not performed. In some embodiments, when the wake-up scheduling is performed, a single wake up time (or a subsequent wake up time) or multiple wake-up times can be scheduled.

In some embodiments, the host processor 130 or the host processor 170 may generate a request to flush a transmit queue/buffer of the wireless processor 115 or the wireless processor 165. In one example, the host processor 130 provides a request to flush a transmit queue/buffer of the wireless processor 115 before the host processor 130 providing any data to the wireless processor or after the host processor providing the EOT indicator during the active state. Upon receiving the request, the wireless processor 115 may flush or discard any packet in the transmit queue/buffer of the wireless processor 115. In addition, the wireless processor 115 may transmit the request to flush and reason(s) for the flush to the wireless processor 165. The wireless processor 165 may receive the request to flush. In response to the request to flush, the wireless processor 165 may determine whether data in a receive queue/buffer of the wireless processor 165 is provided to host processor 170. After confirming that the data in the receive que of the wireless processor 165 is provided to the host processor 170, the wireless processor 165 may flush the receive queue/buffer.

Advantageously, the host processors 130, 170 providing commands or indicators to the wireless processors 115, 165 in a network layer protocol (or L3 layer protocol) can provide implementation flexibility. In one aspect, the host processors 130, 170 configuring the wireless processors 115, 165 to enter the sleep state or the active state allows the wireless processors 115, 165 to be controlled in an application level. Accordingly, less customization may be imposed on the wireless processors 115, 165, such that the wireless processors 115, 165 can be formed or implemented by different vendors or manufacturers.

Advantageously, the host processors 130, 170 providing commands or indicators to the wireless processors 115, 165 in a network layer protocol (or L3 layer protocol) can achieve power efficiency. In one implementation, the wireless processor 115 or the wireless processor 165 may attempt to detect or determine an end of data from the host processor 130 or the host processor 170. However, in such implementation, the wireless processor 115 or the wireless processor 165 may monitor data from the host processor 130 or the host processor 170 in the active state for an extended time period to determine whether end of data occurred or not. In one aspect, the host processor 130 or the host processor 170 generating data for transmission is aware of when the end of data will occur, and can notify the wireless processor 115 or the wireless processor 165 to enter the sleep state. Accordingly, the wireless processor 115 or the wireless processor 165 may not detect or determine the end of data, such that the wireless processor 115 or the wireless processor 165 may operate in the active state for a reduced time period to achieve power savings.

Figure 5:
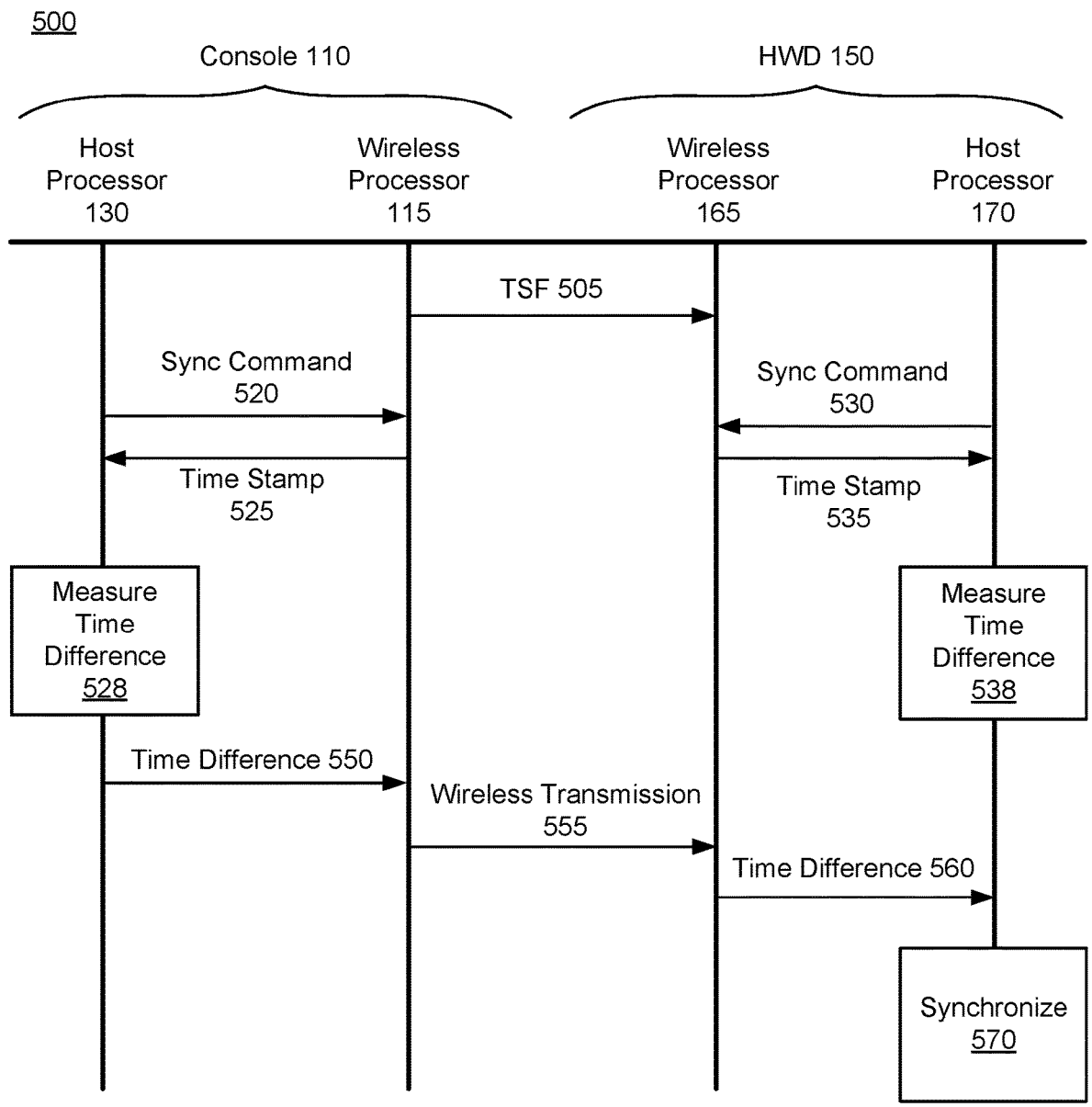
FIG. 5 is an interaction diagram showing a process of synchronizing clocks of a console and a head wearable display, according to an example implementation of the present disclosure.

FIG. 5 is an interaction diagram showing a process 500 of the console 110 and the HWD 150 performing synchronization, according to an example implementation of the present disclosure. In some embodiments, the process 500 is performed by the host processor 130 and the wireless processor 115 of the console 110, and by the host processor 170 and the wireless processor 165 of the HWD 150. In some embodiments, the process 500 is performed by other entities or other components. In some embodiments, the process 500 includes more, fewer, or different steps than shown in FIG. 5.

In some embodiments, the wireless processor 115 transmits 505 a request for time synchronization function (TSF) to synchronize its clock with a clock of the wireless processor 165. In one approach, the clock of the wireless processor 115 and the clock of the wireless processor 165 can be synchronized through a beacon or a probe response frame. The request for the time synchronization function may include a time stamp, at which the request for the time synchronization function is generated. In one example, the wireless processor 115 may transmit a probe response frame or a traffic indication map frame allowing synchronization or a time synchronization function between the wireless processors 115, 165. For example, one of the wireless processors 115, 165 may transmit a probe response frame including a time stamp. In response to the probe response frame, the other of the wireless processors 115, 165 may adjust its clock according to the timestamp to synchronize.

In some embodiments, the host processor 130 generates 520 a synchronization command to synchronize a clock of the host processor 130 according to a clock of the wireless processor 115. In some embodiments, the host processor 130 generates 520 the synchronization command periodically (every frame time or every $5^{th}$ frame time), or upon request. The host processor 130 may provide the synchronization command to the wireless processor 115 through a data link layer protocol (level 2 protocol) or a network layer protocol (level 3 protocol).

In some embodiments, in response to the synchronization command, the wireless processor 115 provides 525 to the host processor 130 an interrupt signal and a timestamp, at which the interrupt signal is generated. In response to the timestamp, the host processor 130 may measure 528 a time delay or difference between a clock of the host processor 130 and a clock of the wireless processor 115. For example, the host processor 135 determines an offset or a delay of the clock of the host processor 130 with respect to the clock of the wireless processor 115.

In some embodiments, the host processor 170 generates 530 a synchronization command to synchronize a clock of the host processor 170 according to a clock of the wireless processor 165. In some embodiments, the host processor 170 generates 530 the synchronization command periodically (every frame time or every $5^{th}$ frame time), or upon request. The host processor 170 may provide the synchronization command to the wireless processor 165 through a data link layer protocol (level 2 protocol) or a network layer protocol (level 3 protocol).

In some embodiments, in response to the synchronization command, the wireless processor 165 provides 535 to the host processor 170 an interrupt signal and a timestamp, at which the interrupt signal is generated. In response to the timestamp, the host processor 170 may measure 538 a time delay or difference between a clock of the host processor 170 and a clock of the wireless processor 165. For example, the host processor 170 determines an offset or a delay of the clock of the host processor 170 with respect to the clock of the wireless processor 165.

In some embodiments, the host processor 130 provides 550 to the wireless processor 115 for transmission the measured time difference between the clocks of the host processor 130 and the wireless processor 115. The wireless processor 115 may receive the time difference, and upconvert the time difference to obtain a wireless signal. The wireless processor 115 may transmit 555 the wireless signal through a wireless medium. The wireless processor 165 of the HWD 150 may receive the wireless signal, and down-convert the wireless signal to obtain the time difference between the clocks of the host processor 130 and the wireless processor 115. The wireless processor 165 may provide 560 the time difference to the host processor 170. The host processor 170 may compare i) the time difference between the clocks of the host processor 130 and the wireless processor 115, and ii) the time difference between the clocks of the host processor 170 and the wireless processor 165, and adjust or synchronize 570 the clock of the host processor 170 according to the comparison, such that the time difference between the clocks of the host processor 170 and the wireless processor 165 can match the time difference between the clocks of the host processor 130 and the wireless processor 115. Hence, clocks of the host processors 130, 170 and the wireless processors 115, 165 can be synchronized.

Advantageously, the synchronization performed according to the process 500 allows the console 110 and the HWD 150 to maintain synchronization. In one approach, the host processors 130, 170 are embodied as a central processing unit and/or a graphics processing unit that employ more reliable clocks than the wireless processors 115, 165 that may operate under various operating states with varying clocks. Hence, by the host processor 130 initiating the synchronization process 500 to synchronize clocks of the wireless processors 115, 165 and the host processor 170, the console 110 and the HWD 150 can maintain better synchronization. In some embodiments, the process 500 can be initiated by the host processor 170 in a manner that the clocks of the host processor 130 and the wireless processors 115, 165 can be synchronized according to the clock of the host processor 170.

Figure 6:
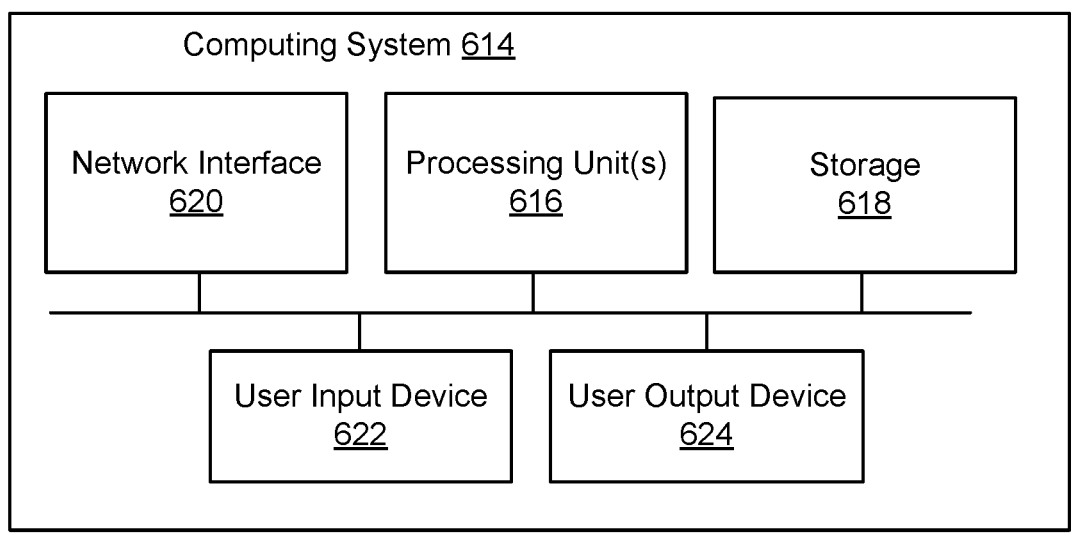
FIG. 6 is a block diagram of a computing environment according to an example implementation of the present disclosure.

Various operations described herein can be implemented on computer systems. FIG. 6 shows a block diagram of a representative computing system 614 usable to implement the present disclosure. In some embodiments, the console 110, the HWD 150 or both of FIG. 1 are implemented by the computing system 614. Computing system 614 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 614 can be implemented to provide VR, AR, MR experience. In some embodiments, the computing system 614 can include conventional computer components such as processors 616, storage device 618, network interface 620, user input device 622, and user output device 624.

Network interface 620 can provide a connection to a wide area network (e.g., the Internet) to which WAN interface of a remote server system is also connected. Network interface 620 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 622 can include any device (or devices) via which a user can provide signals to computing system 614; computing system 614 can interpret the signals as indicative of particular user requests or information. User input device 622 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 624 can include any device via which computing system 614 can provide information to a user. For example, user output device 624 can include a display to display images generated by or delivered to computing system 614. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 624 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 616 can provide various functionality for computing system 614, including any of the functionality described herein as being performed by a server or client, or other functionality associated with message management services.

It will be appreciated that computing system 614 is illustrative and that variations and modifications are possible. Computer systems used in connection with the present disclosure can have other capabilities not specifically described here. Further, while computing system 614 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A first device comprising:
   a wireless processor; and
   a host processor separate from the wireless processor, the host processor coupled to the wireless processor, the host processor configured to:
     provide data of a communication session for an artificial reality to the wireless processor, the wireless processor to transmit the data to a second device through a wireless medium, the first device and the second device comprising a head wearable device and a console for providing the artificial reality, and
     provide an indicator indicating an end of transmission of the data, to the wireless processor, to cause:
       the wireless processor to transmit the indicator to the second device through the wireless medium and to enter a sleep state until a scheduled time for additional data of a subsequent communication session for the artificial reality, and
       the host processor to enter another sleep state until the scheduled time, in response to transmission of the indicator by the wireless processor.

2. The first device of claim 1, wherein the host processor is configured to provide the data to the wireless processor through a network layer protocol of communication between the host processor and the wireless processor.

3. The first device of claim 1, wherein the indicator causes the second device to enter the sleep state.

4. The first device of claim 1, wherein the host processor and the wireless processor are scheduled to enter an active state at a first time for the communication session for the artificial reality.

5. The first device of claim 4, wherein the host processor is configured to provide another indicator to the wireless processor to cause the wireless processor to enter the active state at the scheduled time for the subsequent communication session for the artificial reality, a difference between the first time and the scheduled time corresponding to a frame time of presenting the artificial reality.

6. The first device of claim 1, wherein the second device includes another host processor and another wireless processor coupled to the another host processor,
   wherein the another wireless processor is configured to provide the data from the wireless processor to the another host processor, and
   wherein the another host processor is configured to render the artificial reality according to the data.

7. The first device of claim 6,
   wherein the another wireless processor is configured to provide the indicator from the wireless processor to the another host processor, and
   wherein the another wireless processor and the another host processor are configured to enter the sleep state in response to the indicator.

8. The first device of claim 1, wherein the host processor is configured to provide, to the wireless processor, a command for synchronization, wherein the wireless processor is configured to synchronize a clock of the wireless processor according to a clock of the host processor, in response to the command.

9. The first device of claim 8, wherein the wireless processor is configured to transmit, to the second device through the wireless medium, the command,
   wherein another wireless processor and another host processor of the second device are configured to synchronize with the host processor according to the command.

10. The first device of claim 9, wherein the host processor is configured to schedule the scheduled time to enter an active state for the wireless processor, the host processor, the another wireless processor, and the another host processor.

11. A method comprising:
    providing, by a host processor of a first device coupled to a wireless processor of the first device, data of a communication session for an artificial reality to the wireless processor separate from the host processor;
    transmitting, by the wireless processor, the data to a second device through a wireless medium, the first device and the second device comprising a head wearable device and a console for providing the artificial reality; and
    providing, by the host processor, an indicator indicating an end of transmission of the data, to the wireless processor, to cause:
      the wireless processor to transmit the indicator to the second device through the wireless medium and to enter a sleep state until a scheduled time for additional data of a subsequent communication session for the artificial reality,
      the host processor to enter another sleep state until the scheduled time, in response to transmission of the indicator by the wireless processor.

12. The method of claim 11, wherein providing the data to the wireless processor of the first device includes providing the data to the wireless processor through a network layer of communication between the host processor and the wireless processor.

13. The method of claim 11, further comprising:
    entering, by the host processor and the wireless processor, an active state at a first time for the communication session for the artificial reality.

14. The method of claim 13, further comprising:
    providing, by the host processor, another indicator to the wireless processor to cause the wireless processor to enter the active state at the scheduled time for the subsequent communication session for the artificial reality, a difference between the first time and the scheduled time corresponding to a frame time of presenting the artificial reality.

15. The method of claim 11, wherein the wireless processor is configured to transmit the data and the indicator to the second device, the indicator causing the second device to enter the sleep state after rendering the artificial reality according to the data.

16. The method of claim 15, further comprising:
synchronizing, by the first device, the second device with the first device, the first device and the second device to enter an active state for additional data of an additional communication session for the artificial reality according to the synchronization.

17. A first device comprising:
a wireless processor configured to:
receive, from a second device through a wireless medium, data of a communication session for an artificial reality, and
receive, from the second device through the wireless medium, an indicator indicating an end of transmission of the data;
provide the data and the indicator to a host processor;
enter a sleep state until a scheduled time for additional data of a subsequent communication session for the artificial reality; and
the host processor separate from the wireless processor, the host processor coupled to the wireless processor, and the host processor configured to:
present the artificial reality according to the data, and enter another sleep state until the scheduled time, in response to the indicator after presenting the artificial reality.

18. The first device of claim 17, wherein the host processor and the wireless processor are scheduled to enter an active state for the subsequent communication session for the artificial reality.

19. The first device of claim 17, wherein the wireless processor is configured to provide the data and the indicator to the host processor through a network layer protocol of communication between the host processor and the wireless processor.

20. The first device of claim 17,
wherein the wireless processor is configured to receive, from the second device through the wireless medium, a command for synchronization, and
wherein the host processor is configured to synchronize a first clock of the host processor with a second clock of the wireless processor, in response to the command.

* * * * *